(12) United States Patent
Komura

(10) Patent No.: US 10,850,607 B2
(45) Date of Patent: Dec. 1, 2020

(54) FUEL TANK DEVICE OF VEHICLE

(71) Applicant: TOYOTA JIDOSHA KABUSHIKI KAISHA, Toyota (JP)

(72) Inventor: Toshiyuki Komura, Owariasahi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 4 days.

(21) Appl. No.: 16/284,343

(22) Filed: Feb. 25, 2019

(65) Prior Publication Data

US 2019/0263257 A1 Aug. 29, 2019

(30) Foreign Application Priority Data

Feb. 26, 2018 (JP) .................. 2018-031558

(51) Int. Cl.
*B60K 15/035* (2006.01)
*B60K 15/04* (2006.01)
*B60K 15/03* (2006.01)

(52) U.S. Cl.
CPC ........ *B60K 15/03504* (2013.01); *B60K 15/04* (2013.01); *B60K 2015/03118* (2013.01); *B60K 2015/03256* (2013.01)

(58) Field of Classification Search
CPC .............. B60K 15/04; B60K 15/0403; B60K 15/0458; B60K 15/0461; B60K 2015/03118; B60K 2015/03256; B60K 2015/03263; B60K 15/03504

USPC .................................. 137/528, 535, 539, 540
See application file for complete search history.

(56) References Cited

U.S. PATENT DOCUMENTS

| | | | | |
|---|---|---|---|---|
| 1,275,697 A | * | 8/1918 | Joyce | F16K 1/02 137/329.01 |
| 3,991,792 A | * | 11/1976 | Kettler | B60K 15/0403 138/108 |
| 5,409,042 A | * | 4/1995 | Kirchner | F16L 55/10 138/40 |
| 6,659,122 B1 | * | 12/2003 | Zandeh et al. | B60K 15/00 137/256 |
| 2019/0241064 A1 | * | 8/2019 | Bar et al. | B60K 15/04 |

FOREIGN PATENT DOCUMENTS

| | | |
|---|---|---|
| JP | 8-132896 | 5/1996 |
| JP | 2005-155323 | 6/2005 |
| JP | 2008-100565 | 5/2008 |

* cited by examiner

*Primary Examiner* — Kevin L Lee
(74) *Attorney, Agent, or Firm* — Oblon, McClelland, Maier & Neustadt, L.L.P.

(57) ABSTRACT

A fuel tank device of a vehicle includes a fuel supply pipe, a first fuel tank, a second fuel tank, and a resistance portion. The fuel supply pipe includes a main pipe, and a first branch pipe and a second branch pipe that branch from the main pipe. The first fuel tank is connected to the first branch pipe, the second fuel tank is connected to the second branch pipe, and the resistance portion is provided in the main pipe and is configured to impart resistance to liquid fuel flowing in the main pipe.

7 Claims, 6 Drawing Sheets

FUEL TANK DEVICE OF VEHICLE

INCORPORATION BY REFERENCE

The disclosure of Japanese Patent Application No. 2018-031558 filed on Feb. 26, 2018 including the specification, drawings and abstract is incorporated herein by reference in its entirety.

BACKGROUND

1. Technical Field

The present disclosure relates to a fuel tank device of a vehicle, and particularly to a fuel tank device of a vehicle configured as a so-called dual tank system including two fuel tanks.

2. Description of Related Art

In a fuel tank device of a vehicle in the related art, in order to suppress a discharge of fuel vapor (vapor) evaporating from a fuel tank to the atmosphere during traveling of the vehicle or the like, the vapor is adsorbed by a canister filled with activated carbon, the adsorbed vapor is introduced into an intake path together with fresh air using a negative pressure, and thus a combustion treatment is performed in a fuel chamber of an engine (for example, Japanese Unexamined Patent Application Publication No. 2005-155323 (JP 2005-155323 A)).

As such a fuel tank device, there are many so-called single tank systems in which one fuel supply pipe is connected to one fuel tank as in the case of JP 2005-155323 A, but depending on a layout of other in-vehicle devices in the vehicle, it may be difficult to mount a relatively large fuel tank in the vehicle.

Accordingly, in the related art, a fuel tank device of a so-called dual tank system has been known, in which one fuel supply pipe branches into two branches and is connected to two relatively small fuel tanks that store fuel equal to or more than a relatively large fuel tank (for example, Japanese Unexamined Patent Application Publication No. 2008-100565 (JP 2008-100565 A)).

SUMMARY

In contrast, in recent years, regulations on the discharge of the vapor to the atmosphere have been strengthened, and according to regulations of the Onboard Refueling Vapor Recovery (ORVR) of the U.S., a discharge amount of the vapor to the atmosphere is strictly limited, for example, according to the regulations, the maximum discharge amount of the vapor (an evaporative emission) from the vehicle at a time of refueling is 0.2 (g/gal).

In this respect, in the fuel tank device of the single tank system, since a certain amount of the fuel flows into the fuel tank through the fuel supply pipe at the time of the refueling, a one-way valve at a tip end portion (a downstream end portion) of the fuel supply pipe serves as resistance to disturb a flow, and thus the flow is formed such that a flow path cross section of the fuel supply pipe is filled with the fuel at the tip end portion of the fuel supply pipe. Accordingly, since the flow of the vapor that is about to rise from the fuel tank is shut off at the tip end portion of the fuel supply pipe when the flow path cross section of the fuel supply pipe is filled with the fuel, in the case of the fuel tank device of the single tank system, it is possible to suppress the discharge of the vapor from the refueling port to the atmosphere at the time of the refueling even without taking measures specially.

On the other hand, in the fuel tank device of the dual tank system, since the fuel is distributed such that in a small amount of the fuel flows into each fuel tank at the time of the refueling, at the tip end portion (the downstream end portion) of a branched part (branch pipe) of the fuel supply pipe, the flow that allows the flow path cross section of the branch pipe to be filled with fuel is not formed. For this reason, the flow of the vapor about to rise from the fuel tank is not shut off at the tip end portion of the branch pipe, and the vapor rising through the fuel supply pipe may be discharged from the refueling port to the atmosphere.

Further, even when a certain amount of the fuel flows into the one branch pipe to form the flow such that the flow path cross section of the one branch pipe is filled with the fuel, a very small amount of the fuel flows into the other branch pipe, and thus the flow that allows the flow path cross section of the other branch pipe to be filled with the fuel is not formed, and as a result, the flow of the vapor is not shut off at the tip end portion of the other branch pipe, and the vapor rising through the other branch pipe is discharged from the refueling port to the atmosphere.

The present disclosure provides a fuel tank device of a vehicle configured as a dual tank system that suppresses a discharge of vapor to the atmosphere during refueling.

In the fuel tank device, in a part of a fuel supply pipe where a certain amount of flow rate is expected, a flow is intentionally formed such that a flow path cross section of the fuel supply pipe is filled with liquid fuel.

In particular, an aspect of the disclosure relates to a fuel tank device of a vehicle. The fuel tank device includes a fuel supply pipe, a first fuel tank connected to the first branch pipe, and a second fuel tank connected to the second branch pipe. The fuel supply pipe includes a main pipe, and a first branch pipe and a second branch pipe that branch from the main pipe.

The fuel tank device also includes a resistance portion. The resistance portion is provided in the main pipe and is configured to impart resistance to the liquid fuel flowing in the main pipe.

In the fuel tank device according to the aspect of the disclosure, the resistance portion may impart the resistance to the liquid fuel flowing in the main pipe to form a flow such that the flow path cross section of the main pipe is filled with the liquid fuel.

According to the aspect of the disclosure, since the resistance portion is provided in the main pipe, it is possible to impart the resistance to a relatively large amount of the liquid fuel (a certain amount of the flow rate) before the liquid fuel is distributed to the branch pipe. Accordingly, in the main pipe, since the flow is formed such that the flow path cross section of the main pipe is filled with the liquid fuel, it is possible to shut off both the flow of the vapor rising from the first fuel tank through the branch pipe and the flow of the vapor rising from the second fuel tank through the branch pipe. Therefore, even in a dual tank system, it is possible to suppress a discharge of the vapor to the atmosphere during the refueling.

Further, in the fuel tank device according to the aspect of the disclosure, the resistance portion may include a throttle portion that locally reduces the flow path cross sectional area of the main pipe.

According to the aspect of the disclosure, the resistance is imparted to the liquid fuel with a simple structure in which the throttle portion is provided in the main pipe to form the flow such that the flow path cross section of the main pipe is filled with the liquid fuel, and thus it is possible to suppress the discharge of the vapor to the atmosphere during the refueling.

On the other hand, in a case where the resistance portion includes the throttle portion, due to the structure, the larger the flow rate of the liquid fuel flowing through the main pipe, the resistance becomes larger, and thus it may be difficult for the liquid fuel itself to flow down although it is possible to reliably form the flow such that the flow path cross section of the main pipe is filled with the liquid fuel.

Here, in the fuel tank device according to the aspect of the disclosure, the resistance portion may include a one-way valve that opens solely in a case where the liquid fuel flows down toward each of the first fuel tank and the second fuel tank.

According to the aspect of the disclosure, due to the structure of the one-way valve, the smaller the flow rate of the liquid fuel flowing through the main pipe, the smaller the opening of the one-way valve becomes, and the resistance becomes larger, but the larger the flow rate of the liquid fuel flowing through the main pipe, the larger the opening of the one-way valve becomes, and the resistance becomes smaller. Therefore, in a case where the opening of the one-way valve is small and the resistance is large, it is possible to fill the flow path cross section of the main pipe with a relatively small amount of the liquid fuel, but in a case where the opening of the one-way valve is large and the resistance is small, it is possible to fill the flow path cross section of the main pipe with a relatively large amount of the liquid fuel and to cause the liquid fuel itself to smoothly flow down the flow path.

In the fuel tank device according to the aspect of the disclosure, the one-way valve may include an enlarged diameter portion, a spring, and a valve body. The enlarged diameter portion has a cross sectional diameter larger than a cross sectional diameter of a part of the main pipe. The spring is provided in the enlarged diameter portion. The valve body is urged toward an upstream side by the spring to abut against a step between the main pipe and the enlarged diameter portion to close the main pipe.

As described above, with the fuel tank device of the vehicle according to the aspect of the disclosure, even in the dual tank system, it is possible to suppress the discharge of the vapor to the atmosphere during the refueling.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described with reference to drawings.

First Embodiment

Overall Configuration

Figure 1:
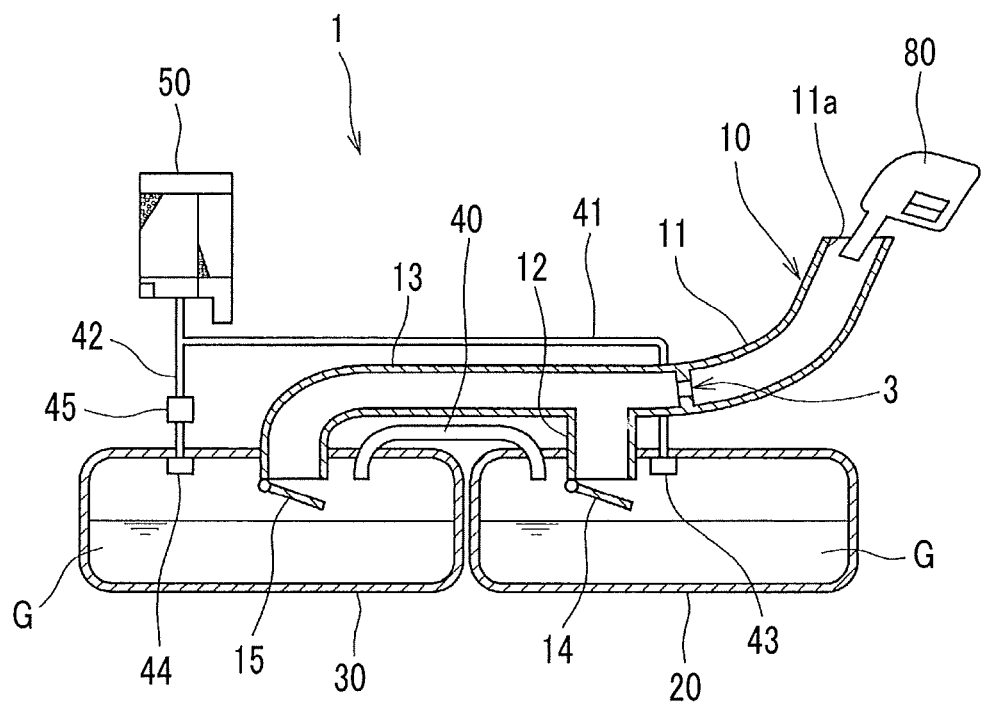
FIG. 1 is a view schematically showing a fuel tank device of a vehicle according to a first embodiment.

FIG. 1 is a view schematically showing a fuel tank device 1 of a vehicle according to the embodiment. The fuel tank device 1 is mounted on a gasoline vehicle (not shown), as shown in FIG. 1, and is configured as a so-called dual tank system in which a fuel supply pipe 10 branches into two branches and is connected to two fuel tanks 20, 30.

The fuel tank device 1 includes a fuel supply pipe 10 to which gasoline (liquid fuel) G is supplied from a refueling nozzle 80, a first fuel tank 20 and a second fuel tank 30 that store the gasoline G, a communication pipe 40 that connects the first fuel tank 20 and the second fuel tank 30, a canister 50 that adsorbs evaporated fuel (vapor) V generated in the first fuel tank 20 and the second fuel tank 30, and a first vapor pipe 41 and a second vapor pipe 42 that communicate with the canister 50, and the first fuel tank 20 and the second fuel tank 30 respectively.

The fuel supply pipe 10 has a main pipe 11 in which an opening at an upstream end thereof constitutes a refueling port 11a into which a refueling nozzle 80 is inserted at a time of refueling, a first branch pipe 12 and a second branch pipe 13 branching from a downstream end of the main pipe 11 into two branches. The first branch pipe 12 is connected to the first fuel tank 20, and a one-way valve 14 is provided at the downstream end of the first branch pipe 12, and the second branch pipe 13 is connected to the second fuel tank 30 and a one-way valve 15 is provided at the downstream end of the second branch pipe 13. The one-way valves 14, 15 are urged by a torsion spring (not shown) toward sides of closing the first branch pipe 12 and the second branch pipe 13 respectively and are configured to be normally closed and to open solely in a case where the gasoline G flows down into the first fuel tank 20 and the second fuel tank 30 respectively at the time of the refueling.

The canister 50 is filled with an adsorbent such as activated carbon, and vapor V which is generated by an evaporation of the gasoline G in the first fuel tank 20 and the second fuel tank 30 and flows into the canister 50 via the first vapor pipe 41 and the second vapor pipe 42 is adsorbed by the adsorbent. Further, the canister 50 is configured to be connected to an engine (not shown) via a purge pipe (not shown), and a negative pressure generated at the time of an operation of the engine is applied to the canister 50 to desorb the vapor V adsorbed by the adsorbent, and thus the desorbed vapor V is sent to the engine and combusted.

The first fuel tank 20 to which the first branch pipe 12 is connected is connected to the canister 50 via the first vapor pipe 41. In the first vapor pipe 41, a full tank regulation valve 43 is provided at a tip end portion (downstream end portion) on the first fuel tank 20 side.

The full tank regulation valve 43 is provided with a float (not shown) having a specific gravity smaller than the gasoline G, and in a state in which a level of the gasoline G in the first fuel tank 20 is low and the float does not float on the level of the gasoline G (in a not full tank state), an open valve state is established, but when the first fuel tank 20 is in a full tank state with a progress of the refueling and the float floats on the level of the gasoline G, a closed valve state is established. In the open valve state of the full tank regulation valve 43, the gas in the first fuel tank 20 (including the vapor V) is able to flow into the canister 50 through the first vapor pipe 41, but in the closed valve state of the full tank regulation valve 43, since the gas in the first fuel tank 20 is not able to pass through the first vapor pipe 41, the gas is not able to flow into the canister 50.

The second fuel tank 30 to which the second branch pipe 13 is connected is connected to the canister 50 via the second vapor pipe 42. In the second vapor pipe 42, a cutoff valve 44 is provided at the tip end portion of the second fuel tank 30 side thereof, and a check valve 45 is provided between the second fuel tank 30 and the canister 50.

The cutoff valve 44 is configured to normally open and exhausts the gas in the second fuel tank 30 (including the vapor V) to the canister 50 and to be closed when the vehicle is turned or rolled over so as to suppress flowing of the gasoline G into the canister 50.

On the other hand, the check valve 45 is configured to be normally closed (including the time of the refueling), and to open when the pressure in the second fuel tank 30 becomes equal to or lower than a preset set pressure. In the open valve state of the check valve 45, the gas (including the vapor V) in the second fuel tank 30 is able to flow into the canister 50 through the second vapor pipe 42, and in the closed valve state of the check valve 45, the gas in the second fuel tank 30 is not able to pass through the second vapor pipe 42, and is not able to flow into the canister 50.

In the fuel tank device 1 configured as described above, at the time of the refueling, the gasoline G supplied from the refueling nozzle 80 inserted into the refueling port 11a flows down through the main pipe 11 and then is distributed to the first branch pipe 12 and the second branch pipe 13.

The gasoline G distributed to the second branch pipe 13 opens the one-way valve 15 and flows into the second fuel tank 30. At this time, since the cutoff valve 44 is open but the check valve 45 is closed, the gas in the second fuel tank 30 does not flow into the second vapor pipe 42 and flows through the communication pipe 40 to the first fuel tank 20 side even when internal pressure rises as the level of the gasoline G in the second fuel tank 30 rises.

On the other hand, the gas in the first fuel tank 20 (including the gas flown from the second fuel tank 30) flows into the canister 50 through the first vapor pipe 41 since the full tank regulation valve 43 is open. When the supplying of the gasoline G for the refueling is progressed, the first fuel tank 20 becomes full (the full tank state) and the float floats on the risen level of the gasoline G, the full tank regulation valve 43 is closed, and thus the gas in the first fuel tank 20 does not flow through the first vapor pipe 41.

When the gasoline G is additionally supplied for the refueling in a state in which the gas in the first fuel tank 20 and the second fuel tank 30 does not flow into the first vapor pipe 41 and the second vapor pipe 42, the gasoline G supplied for refueling does not flow into the first fuel tank 20 and the second fuel tank 30 and remains in the fuel supply pipe 10, and thus the level of the gasoline G in the fuel supply pipe 10 rises. Further, when the level of the gasoline G in the fuel supply pipe 10 reaches the refueling nozzle 80, the refueling is stopped by a so-called auto stop mechanism of the refueling nozzle 80.

Resistance Portion

In recent years, the regulation concerning the discharge of the vapor V to the atmosphere tends to be strengthened, and according to the ORVR regulation of the U.S., the discharge amount of the vapor V to the atmosphere from the refueling port 11a at the time of the refueling is strictly regulated, for example.

Figure 6:
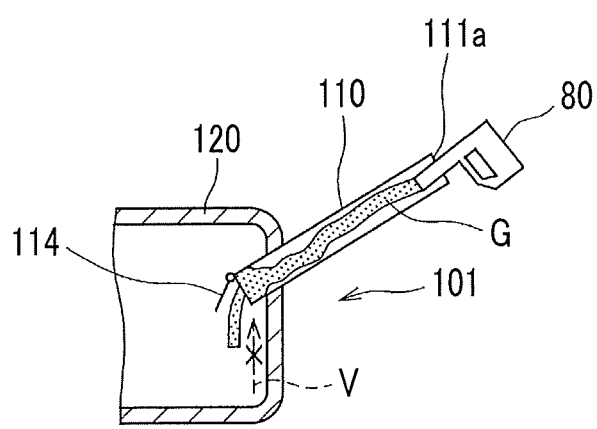
FIG. 6 is a view schematically showing a fuel supply pipe during refueling in a fuel tank device of a single tank system.

In this respect, for example, as shown in FIG. 6, in a so-called single tank system of a fuel tank device 101 in which one fuel supply pipe 110 is connected to one fuel tank 120, at the time of the refueling, a certain amount of the gasoline G flows into the fuel tank 120 through the fuel supply pipe 110. Accordingly, a one-way valve 114 at the tip end portion of the fuel supply pipe 110 serves as resistance to disturb the flow, and thus a vortex flow is generated, and the flow is formed such that the flow path cross section of the fuel supply pipe 110 is filled with the gasoline G at the tip end portion of the fuel supply pipe 110. Since the flow of the vapor V (see a broken line arrow in FIG. 6) that is about to rise from the fuel tank 120 is shut off at the tip end portion of the fuel supply pipe 110 when the flow path cross section of the fuel supply pipe 110 is filled with the gasoline G in this manner, in the case of the fuel tank device 101 of the single tank system, it is possible to suppress the discharge of the vapor V to the atmosphere from a refueling port 111a at the time of the refueling even without taking measures specially.

Figure 7A:
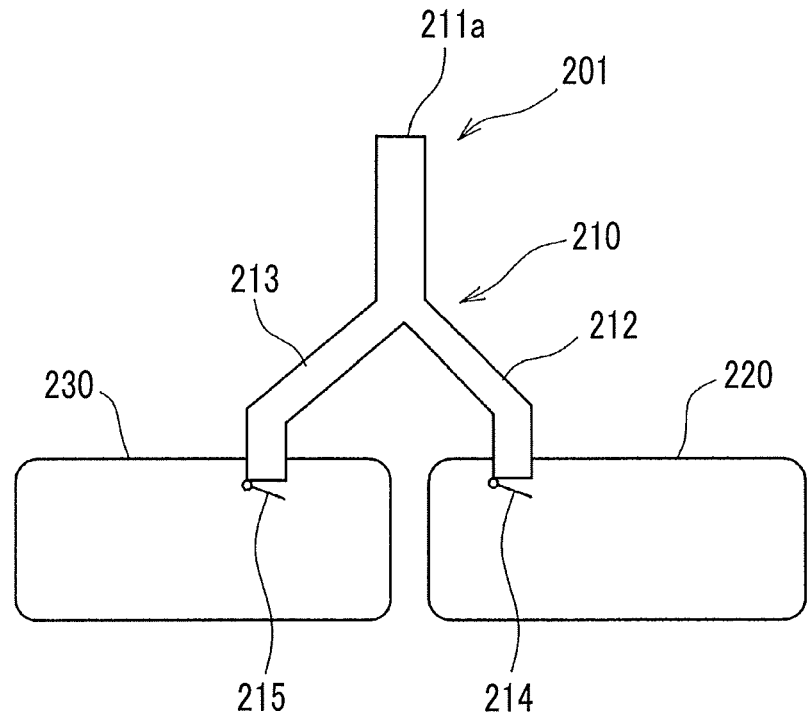
FIG. 7A is a view schematically showing a fuel tank device of a dual tank system in the related art.
Figure 7B:
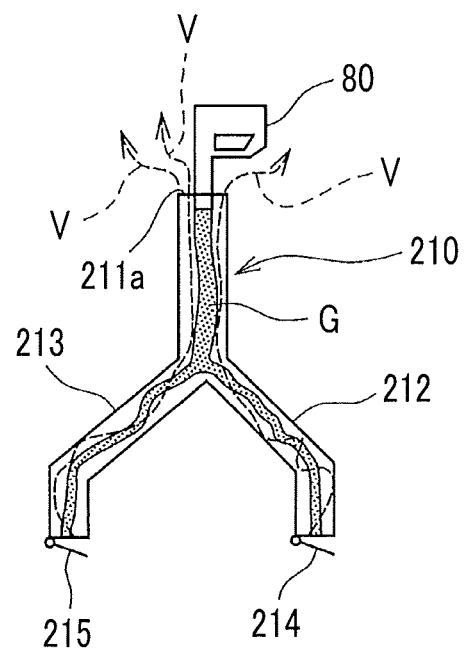
FIG. 7B is a view schematically showing the fuel tank device of the dual tank system in the related art.

On the other hand, in a fuel tank device 201 of the so-called dual tank system in which a fuel supply pipe 210 branches into two branches and is connected to two fuel tanks 220, 230 as shown in FIG. 7A, the gasoline G is distributed to branch pipes 212, 213, to flow in a relatively small amount for the fuel into the respective fuel tanks 220, 230 at the time of the refueling, as shown in FIG. 7B. Therefore, in the fuel tank device 201 of the dual tank system, even when one-way valves 214, 215 are provided, the flow allowing the flow path cross sections of the branch pipes 212, 213 to be filled with the gasoline G at the tip end portions of the branch pipes 212, 213 is not formed. Accordingly, the flow of the vapor V about to rise from the fuel tanks 220, 230 (see the broken line arrow in FIG. 7B) may not be shut off at the tip end portions of the branch pipes 212, 213, and the vapor V rising through the fuel supply pipe 210 may be discharged to the atmosphere from a refueling port 211a.

Further, even when the certain amount of the gasoline G flows into one branch pipe 212 to form the flow such that the flow path cross section of the one branch pipe 212 is filled with the gasoline G, a very small amount of the gasoline G flows into the other branch pipe 213, and thus the flow that allows the flow path cross section of the other branch pipe 213 to be filled with the gasoline G is not formed, and as a result, the flow of the vapor V is not shut off at the tip end portion of the other branch pipe 213, and the vapor V rising through the other branch pipe 213 is discharged from the refueling port 211a to the atmosphere.

Here, in the embodiment, in a part of the fuel supply pipe 10 where the certain amount of the flow rate is expected, the flow is intentionally formed such that the flow path cross section of the fuel supply pipe 10 is filled with the gasoline G. Specifically, in the fuel tank device 1 of the vehicle of the embodiment, the resistance is imparted to the gasoline G flowing through the main pipe 11 at a part of the main pipe 11 which is positioned in front of the start of the branching in the fuel supply pipe 10, and thus a resistance portion 3 is provided to form the flow such that the flow path cross section of the main pipe 11 is filled with the gasoline G. In descriptions below, a mass of the liquid fuel (the gasoline G) generated by "the flow allowing the flow path cross section of the main pipe 11 to be filled with the gasoline G" is also referred to as a "liquid seal portion 5".

Figure 2A:
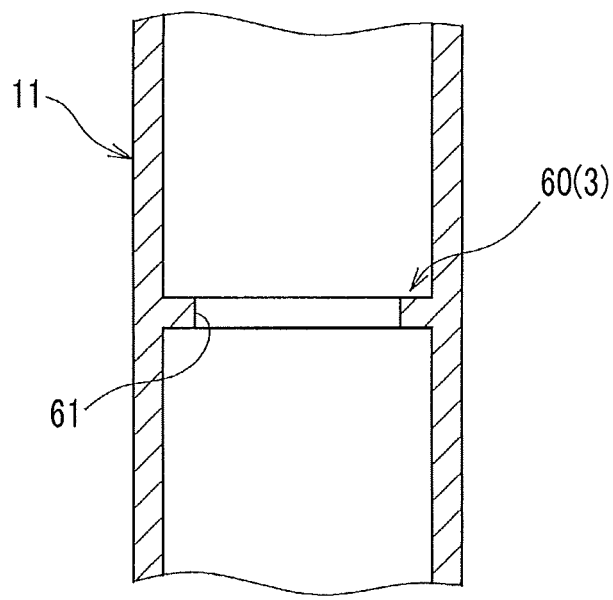
FIG. 2A is an enlarged view schematically showing a resistance portion.
Figure 2B:
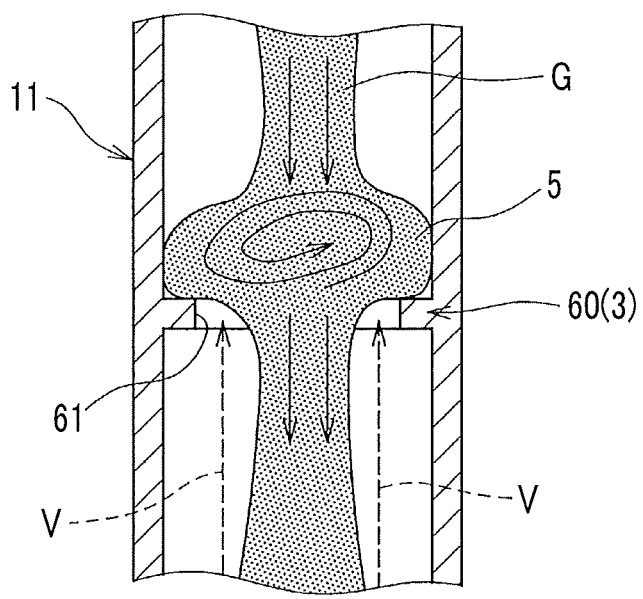
FIG. 2B is an enlarged view schematically showing the resistance portion.

Accordingly, in the embodiment, the resistance portion 3 includes a throttle portion 60 in which a flow path cross sectional area of the fuel supply pipe 10 is locally reduced. Specifically, as shown in FIG. 2A, the throttle portion 60 is formed by an annular protrusion 61 protruding from an inner peripheral surface of the main pipe 11 and having a protrusion height of about 10% of an inner diameter of the main pipe 11. By providing such a throttle portion 60 in the main pipe 11, it is possible to impart the resistance to the relatively large amount of the gasoline G (the certain amount of the flow rate) before being distributed to the first branch pipe 12 and the second branch pipe 13. Accordingly, the resistance is imparted by the throttle portion 60 to generate the disturbance of the flow of the gasoline G flowing down through the main pipe 11, and as shown in FIG. 2B, the vortex flow is formed to generate the liquid seal portion 5. In this way, when the liquid seal portion 5 is generated, a space from the refueling port 11a to a part in front of the throttle portion 60 in the fuel supply pipe 10 and a space from the throttle portion 60 to the first fuel tank 20 and the second fuel tank 30 are divided by the liquid seal portion 5. Therefore, as indicated by the broken line arrow in FIG. 2B, the flow of the vapor V is not able to pass through the liquid seal portion 5, and thus the flow of the vapor V rising toward the refueling port 11a is shut off.

Figure 3:
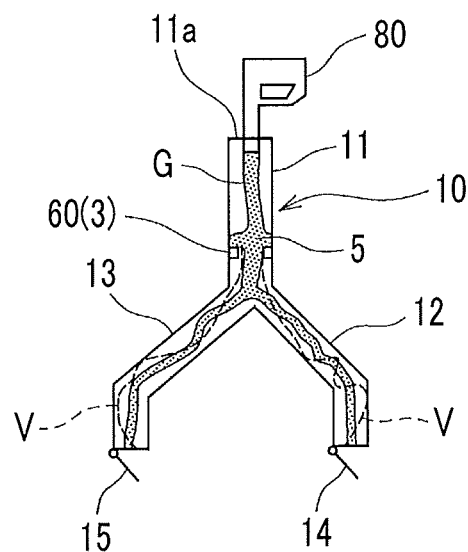
FIG. 3 is a view schematically showing a fuel supply pipe during refueling.

Therefore, as shown in FIG. 3, by the liquid seal portion 5 formed in the main pipe 11 in front of the start of the branching, it is possible to shut off both of the flow of the vapor V rising from the first fuel tank 20 through the first branch pipe 12 and the flow of the vapor V rising from the second fuel tank 30 through the second branch pipe 13.

Therefore, according to the fuel tank device 1 of the vehicle of the embodiment, even in the dual tank system, it is possible to suppress the discharge of the vapor V to the atmosphere during the refueling by forming the liquid seal portion 5 in the main pipe 11 with a simple structure in which the throttle portion 60 is provided in the main pipe 11 in front of the start of the branching in the fuel supply pipe 10.

Refueling Test

Next, a brief description will be given of the refueling test performed to confirm an effect of the fuel tank device 1 of the vehicle of the embodiment.

Figure 4:
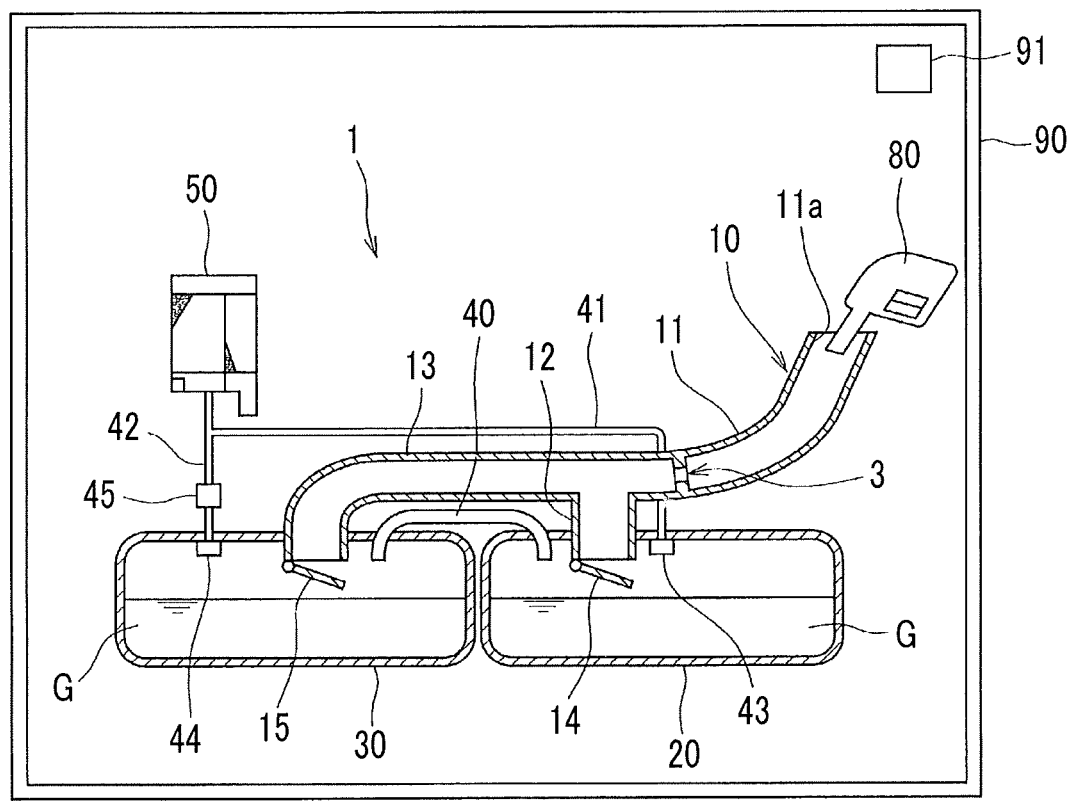
FIG. 4 is a view schematically describing a refueling test.

FIG. 4 is a view schematically describing the refueling test. In the refueling test, as an example, the vehicle (not shown) on which the fuel tank device 1 is mounted is installed in a sealed room called a sealed housing for evaporative determination (SHED) 90, and the discharge amount of the evaporative emission (the gasoline vapor) from the fuel tank device 1 is measured by an analyzer 91 at the time of the refueling inside the SHED 90.

Further, as a comparative example, the vehicle (not shown) on which the fuel tank device 201 of FIGS. 7A and 7B that does not have the resistance portion 3 (the throttle portion 60) is mounted is installed in the SHED 90, and the discharge amount of the evaporative emission from the fuel tank device 201 is measured by the analyzer 91 at the time of the refueling in the SHED 90.

According to such a refueling test, in a case where the fuel tank device 1 provided with the resistance portion 3 (throttle portion 60) in the fuel supply pipe 10 is used, as compared with the comparative example, a confirmation is made that the discharge amount of the evaporative emission is able to be reduced by 80% (in the specification, an expression "80%" includes "about 80%").

Second Embodiment

The embodiment is different from the first embodiment in that the resistance portion 3 includes a valve. Hereinafter, differences from the first embodiment will be mainly described.

As described above, according to the first embodiment, with the simple structure in which the throttle portion 60 is provided in the part of the main pipe 11 in front of the start of the branching in the fuel supply pipe 10, the discharge of the vapor V to the atmosphere during the refueling is able to be suppressed. Further, since the larger the flow rate of the gasoline G flowing through the main pipe 11, the resistance to the gasoline G becomes larger due to the structure in a case where the resistance portion 3 includes the throttle portion 60, it is possible to reliably form the liquid seal portion 5, but it may be difficult for the gasoline G to flow down (it becomes difficult to refuel).

Here, in the embodiment, the resistance portion 3 includes a one-way valve 70 which opens solely in a case where the gasoline G flows down to the first fuel tank 20 side and the second fuel tank 30 side.

Figure 5A:
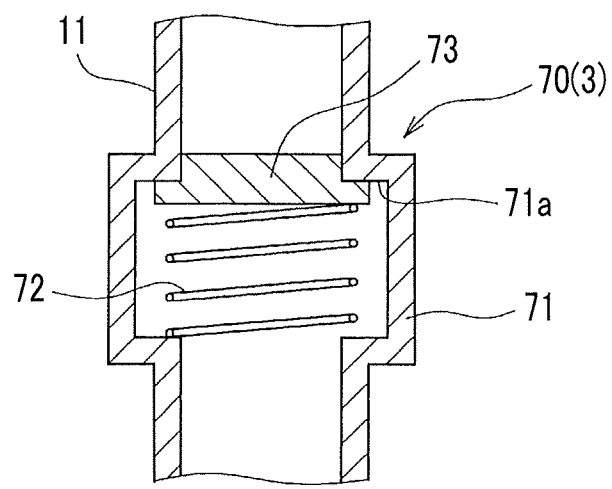
FIG. 5A is an enlarged view schematically showing a resistance portion according to a second embodiment.
Figure 5B:
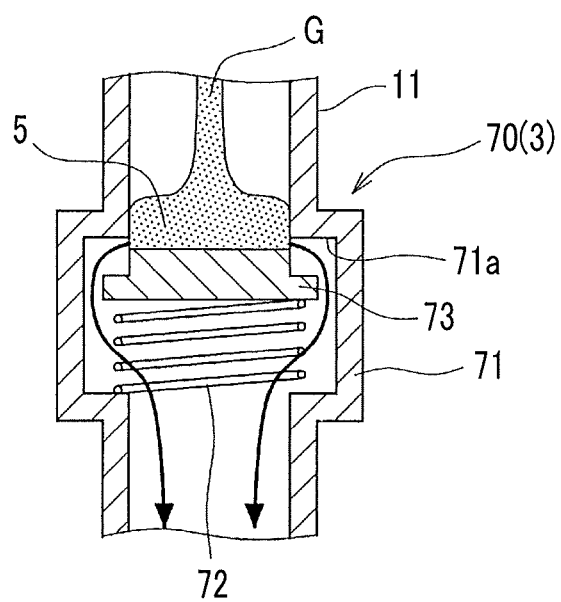
FIG. 5B is an enlarged view schematically showing the resistance portion according to the second embodiment.
Figure 5C:
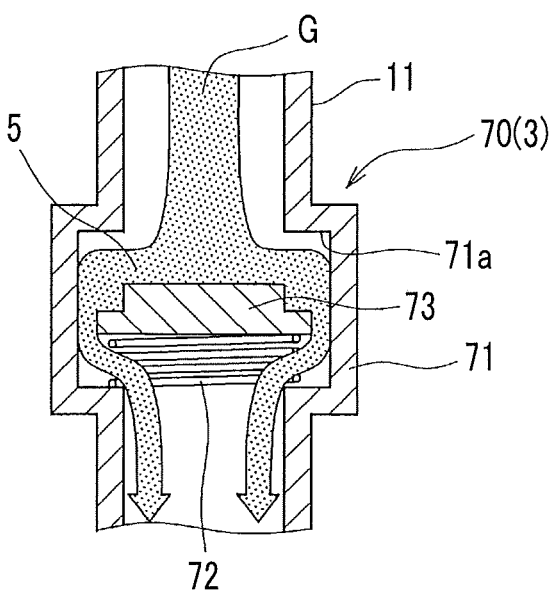
FIG. 5C is an enlarged view schematically showing the resistance portion according to the second embodiment.

FIGS. 5A to 5C are enlarged views schematically showing the resistance portion 3 according to the embodiment. As shown in FIG. 5A, the one-way valve 70 which constitutes the resistance portion 3 includes an enlarged diameter portion 71 of which a diameter of a part of the main pipe 11 is enlarged, a spring 72 provided in the enlarged diameter portion 71, and a valve body 73 that abuts against a step 71a between the main pipe 11 and the enlarged diameter portion 71 to close the main pipe 11 by being urged toward the upstream side by the spring 72.

In the one-way valve 70 constituted as described above, since the smaller the flow rate of the gasoline G flowing through the main pipe 11, the smaller the gap between the valve body 73 pressed down against an urging force of the spring 72 and the step 71a, the resistance to the gasoline G flowing down through the main pipe 11 becomes larger. On the other hand, in the one-way valve 70, since the larger the flow rate of the gasoline G flowing through the main pipe 11 becomes, the larger the gap between the valve body 73 pressed down against the urging force of the spring 72 and the step 71a becomes, the resistance to the gasoline G flowing down through the main pipe 11 becomes smaller.

Accordingly, in a case where the flow rate of the gasoline G flowing through the main pipe 11 is relatively small, in other words, in a case where the opening of the one-way valve 70 is small and the resistance to the gasoline G flowing down through the main pipe 11 is large, as shown in FIG. 5B, it is possible to form the liquid seal portion 5 in the main pipe 11 even with the relatively small amount of gasoline G. On the other hand, as shown in FIG. 5C, in a case where the flow rate of the gasoline G flowing through the main pipe 11 is relatively large, in other words, in a case where the opening of the one-way valve 70 is large and the resistance to the gasoline G flowing down through the main pipe 11 is small, it is possible to form the liquid seal portion 5 in the main pipe 11 by the relatively large amount of gasoline G and allow the gasoline G itself to smoothly flow down.

That is, according to the embodiment, it is possible to smoothly supply the gasoline G for the refueling and to suppress the discharge of the vapor V to the atmosphere during the refueling.

Other Embodiments

The disclosure is not limited to the embodiment and can be implemented in various other forms without departing from the spirit or main features thereof.

In each of the above-described embodiments, the disclosure is applied to the fuel tank device 1 of a gasoline vehicle but is not limited thereto, and the disclosure may be applied to a fuel tank device mounted on the vehicle that uses easily evaporable fuel other than the gasoline.

In the above embodiments, the resistance portion 3 includes the throttle portion 60 and the one-way valve 70, respectively, but the disclosure is not limited thereto as long as the flow is formed such that the flow path cross section of the main pipe 11 is filled with the liquid fuel by imparting the resistance to the liquid fuel flowing in the main pipe 11, and thus the resistance portion 3 may include a portion other than the throttle portion 60 and the one-way valve 70.

Further, in each of the above embodiments, the first fuel tank 20 and the second fuel tank 30 may have the same height but the disclosure is not limited thereto, and a difference in height may be provided between the first fuel tank 20 and the second fuel tank 30.

The embodiments described above are solely illustrative in all respects, and need not be interpreted restrictively. Furthermore, all variations and modifications fall within the present disclosure.

According to the disclosure, since the discharge of the vapor to the atmosphere during the refueling can be suppressed, the disclosure is very usefully applied to the fuel tank device of the vehicle configured as the dual tank system.

What is claimed is:

1. A fuel tank device of a vehicle, the fuel tank device comprising:
    a fuel supply pipe including
    a main pipe, and
    a first branch pipe and a second branch pipe that branch from the main pipe at a branching point;
    a first fuel tank connected to the first branch pipe;
    a second fuel tank connected to the second branch pipe; and
    a resistance portion provided in the main pipe and configured to impart resistance liquid fuel flowing in the main pipe,
    wherein the resistance portion is provided upstream of the branching point.

2. The fuel tank device according to claim 1, wherein the resistance portion imparts the resistance to the liquid fuel flowing in the main pipe to form a flow such that a flow path cross section of the main pipe is filled with the liquid fuel.

3. The fuel tank device according to claim 1, wherein the resistance portion includes a throttle portion that locally reduces a flow path cross sectional area of the main pipe.

4. The fuel tank device according to claim 1, wherein the resistance portion includes a one-way valve that opens solely in a case where the liquid fuel flows down toward each of the first fuel tank and the second fuel tank.

5. The fuel tank device according to claim 4, wherein the one-way valve includes
    an enlarged diameter portion having a cross sectional diameter larger than a cross sectional diameter of a part of the main pipe,
    a spring provided in the enlarged diameter portion, and
    a valve body that is urged toward an upstream side by the spring to abut against a step between the main pipe and the enlarged diameter portion to close the main pipe.

6. The fuel tank device according to claim 3, wherein the throttle portion includes an annular protrusion protruding from an inner peripheral surface of the main pipe.

7. The fuel tank device according to claim 6, wherein a protrusion height is 10% of an inner diameter of the main pipe.

* * * * *